United States Patent [19]

Youakim

[11] Patent Number: 5,036,742
[45] Date of Patent: Aug. 6, 1991

[54] TEMPO MONITORING DEVICE AND ASSOCIATED METHOD

[76] Inventor: Phillip M. Youakim, 122 Dexter St., Tonawanda, N.Y. 14150

[21] Appl. No.: 373,686

[22] Filed: Jun. 30, 1989

Related U.S. Application Data

[63] Continuation of Ser. No. 89,513, Aug. 26, 1987, abandoned.

[51] Int. Cl.$^5$ .................... G09B 15/00; G10D 13/02; G10G 1/00
[52] U.S. Cl. .................................. 84/411 R; 84/453; 84/477 R; 84/484
[58] Field of Search ...................... 84/453, 411, 477 R, 84/484, DIG. 12, 464, DIG. 24, 723-725, 730, 733, 734, 743; 340/683; 369/128, 251; 128/689, 690, 696, 706, 707, 709, 712, 713, 714

[56] References Cited

U.S. PATENT DOCUMENTS

| | | | |
|---|---|---|---|
| 3,623,734 | 11/1971 | Sakamoto | 369/128 |
| 3,725,561 | 4/1973 | Paul | 84/DIG. 12 |
| 4,281,663 | 8/1981 | Pringle | 128/689 |
| 4,300,225 | 11/1981 | Lambl | 84/464 R X |
| 4,301,528 | 11/1981 | Lert | 369/251 X |
| 4,392,409 | 7/1982 | Coad, Jr. et al. | 84/477 R X |
| 4,418,598 | 12/1983 | Klynas | 84/1.04 X |
| 4,583,443 | 4/1986 | Senghaas et al. | 84/484 |
| 4,602,551 | 7/1986 | Firmani et al. | 84/484 |
| 4,788,983 | 12/1988 | Brink et al. | 128/706 X |

FOREIGN PATENT DOCUMENTS

| | | | |
|---|---|---|---|
| 3140483 | 4/1983 | Fed. Rep. of Germany | 84/DIG. 24 |
| 0160681 | 12/1981 | Japan | 84/484 |

Primary Examiner—Stanley J. Witkowski
Attorney, Agent, or Firm—Hodgson, Russ, Andrews, Woods & Goodyear

[57] ABSTRACT

A device and method for monitoring the tempo of an instrument generating tempo beats involves the sensing of each tempo beat, measuring the time interval between successive beats, dividing the time interval into a minute, and visually indicating the measured beats/min. between each two successive beats. The device includes a piezo transducer for sensing the beats, an electronic timer for measuring the time interval between each two successive beats, and a display associated with the timer for visually displaying the measured beats/min. time interval. The device thus provides visual feedback to a musician or user of the tempo of the instrument being played.

4 Claims, 3 Drawing Sheets

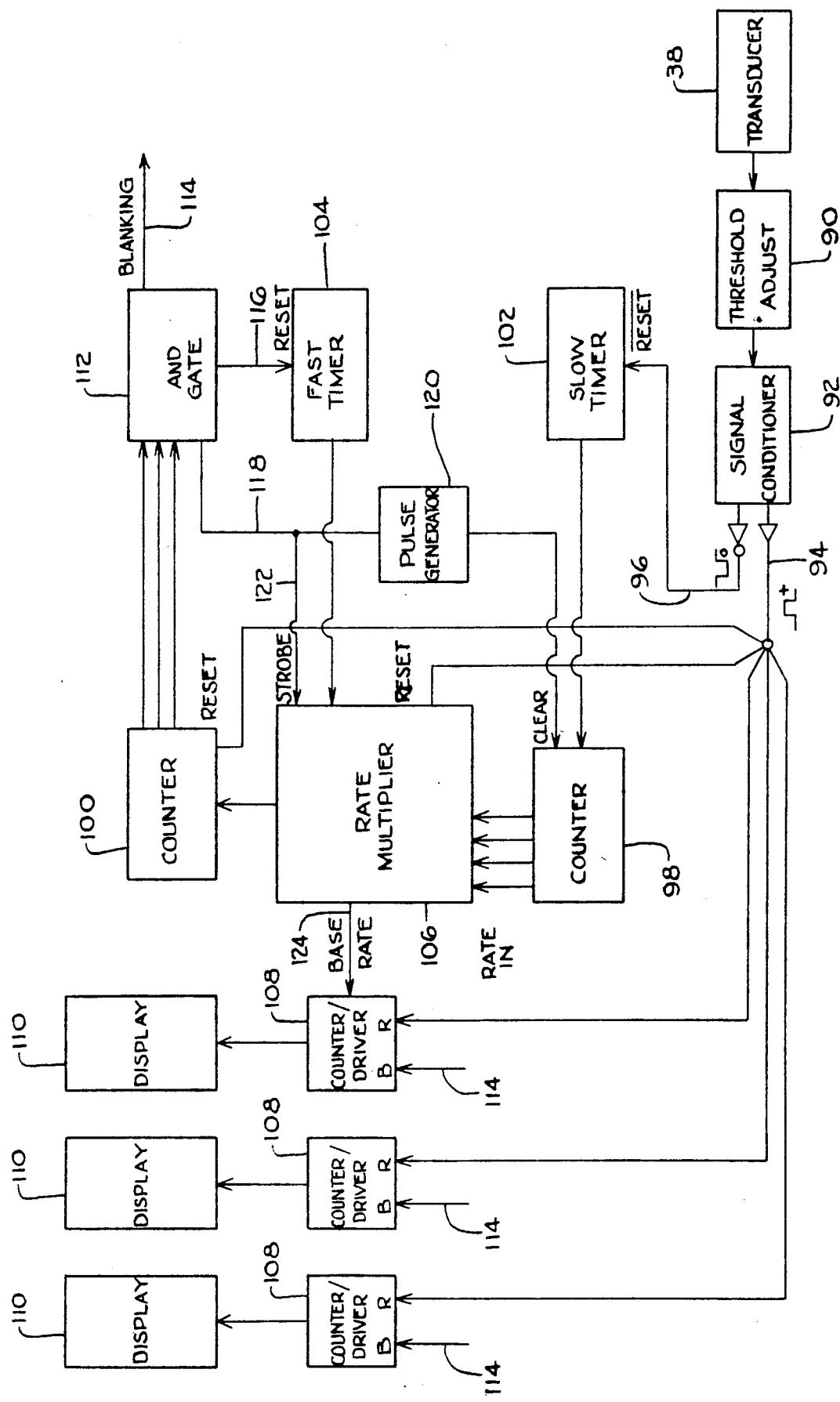

5,036,742

TEMPO MONITORING DEVICE AND ASSOCIATED METHOD

This application is a continuation of application Ser. No. 07/089,513, filed Aug. 26, 1987 and now abandoned.

BACKGROUND OF THE INVENTION

This invention relates generally to the field of music accessories, and relates more particularly to a tempo monitoring device and an associated method.

There exist known apparatus, such as the metronome, for marking exact time for a musician. However, such an apparatus commonly marks time at a steady rate and cannot compensate for purposeful increases or decreases in music tempo which the musician may desire. Therefore, in tempo monitoring applications in which a musician desires to modify or vary the tempo of music played by his instrument yet be informed of the steadiness of the tempo during selected portions of the tune, such known time-marking apparatus cannot be used.

It is an object of the present invention to provide a new and improved device and method for monitoring the tempo of an instrument.

Another object of the present invention is to provide such a device and method enabling a musician to pace himself and to adjust the music tempo as desired.

Still another object of the present invention is to provide such a device providing visual feedback to the musician of the steadiness of the tempo of the music played.

Yet still another object of the present invention is to provide such a device which is lightweight, compact and portable.

A further object of the present invention is to provide such a device which is silent in operation.

A still further object of the present invention is to provide such a device which is well-suited for studio, practice or live performances.

SUMMARY OF THE INVENTION

This invention resides in a device and associated method for monitoring the tempo of music played with an instrument generating tempo beats.

The device of this invention includes means for sensing each tempo beat generated by the instrument and computer means responsive to the sensed beats for measuring the time interval between successive beats and dividing the interval into a time unit, i.e. one minute. The device further includes indicator means associated with the computer means for providing a visual indication of the measured beats/time unit, i.e. beats/minute, between each two successive beats.

The method of the invention includes the steps involved in providing a visual indication of the music tempo. More specifically, the method includes the steps of sensing each tempo beat, measuring the time interval between successive beats, dividing the internal into a time unit, i.e. minute, and visually indicating the measured beats/time unit, i.e. beats/minute, between each two successive beats.

BRIEF DESCRIPTION OF THE DRAWINGS

FIG. 5 is a detailed block diagram of the control circuit shown generally in FIG. 4;

DETAILED DESCRIPTION OF ILLUSTRATED EMBODIMENTS

Figure 1:
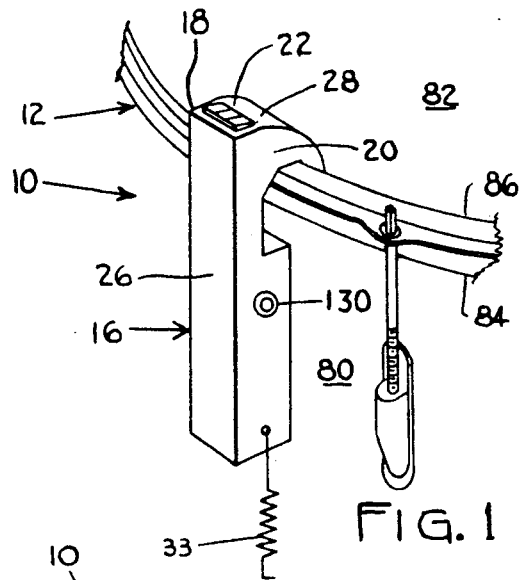
FIG. 1 is a perspective view of one embodiment of the device in accordance with the present invention shown operatively positioned upon the edge of a snare drum.
Figure 2:
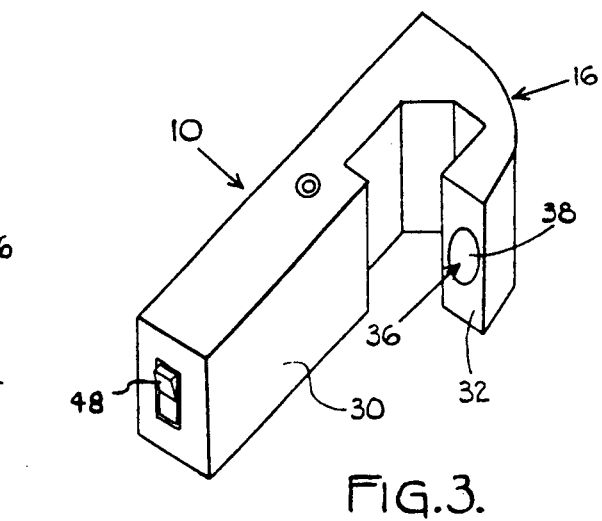
FIG. 2 is a side elevation view of the FIG. 1 device and drum.

Turning now to the drawings in greater detail and considering first FIG. 1, there is illustrated a tempo monitoring device, in accordance with the apparatus of the present invention and generally indicated 10, shown operatively positioned upon the edge of a snare drum 12 capable of generating identifiable tempo beats when played. As best shown in FIG. 2, the drum 12 includes a generally cylindrical shell 80, a skin 82 stretched across the shell 80, a hoop 84 for holding the skin 82 in place, and a rim 86. As will be apparent hereinafter, the device 10 engages the drum rim 86 and hoop 84 when the device 10 is operatively positioned upon the drum 12.

Figure 3:
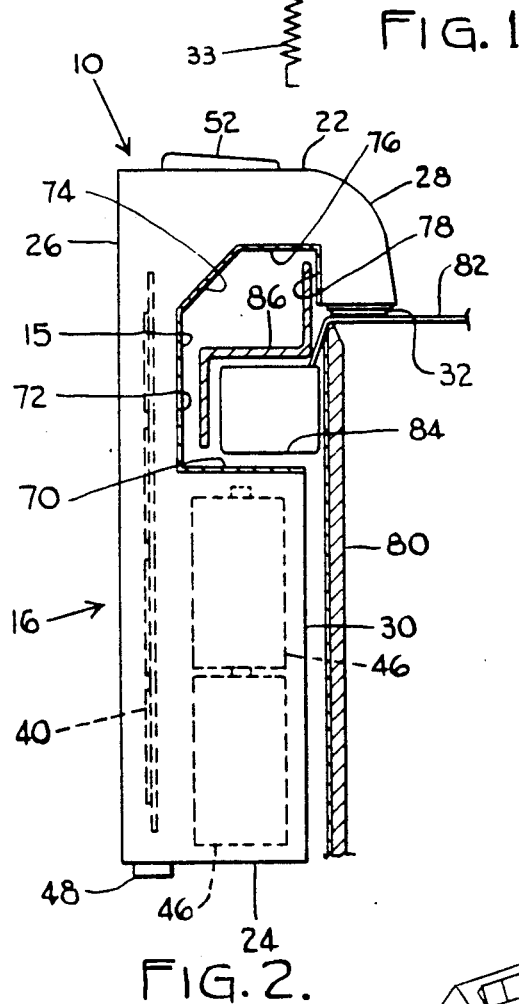
FIG. 3 is a perspective view of the FIG. 1 embodiment showing the underside thereof.

With reference to FIGS. 1-3, the device 10 includes housing means in the form of a substantially enclosed box 16. The box 16 is constructed of a suitable material, such as molded polyurethane, and defines two opposite side surfaces 18, 20, opposite top and bottom surfaces 22, 24, respectively, and a back surface 26. The top surface 22 is arcuate as shown so that a front portion 28 thereof extends generally downwardly as a path is traced from the back surface 26 and along the top surface 22. The box 16 further defines a frontal drum-facing surface 30 as shown and a skin-engaging surface 32 arranged generally perpendicular to the surface 30 and the adjoining portion 28 of the top surface 22. The drum-facing and skin-engaging surfaces 30 and 32 are joined by a series of surfaces 70, 72, 74, 76 and 78 which collectively define a notch 15 as shown in FIG. 2 in the box 16 for attaching the device 10 to the drum 12. More specifically, and with reference still to FIG. 2, the notch 15 is of such size to accept the drum rim 86 and hoop 84 when the box 16 is manipulated thereover so that the box 16 is effectively hooked to the drum 12. In such a hooked condition, the weight of the device 10 contributes to the stability with which the device 10 rests upon the drum 12. If desired, an optional spring 33 can be connected between the box 16 as shown in FIG. 1, and the bottom rim of the drum 12 to prevent excessive bouncing of the device 10 such as can occur if the drum 12 is played hard.

Figure 4:
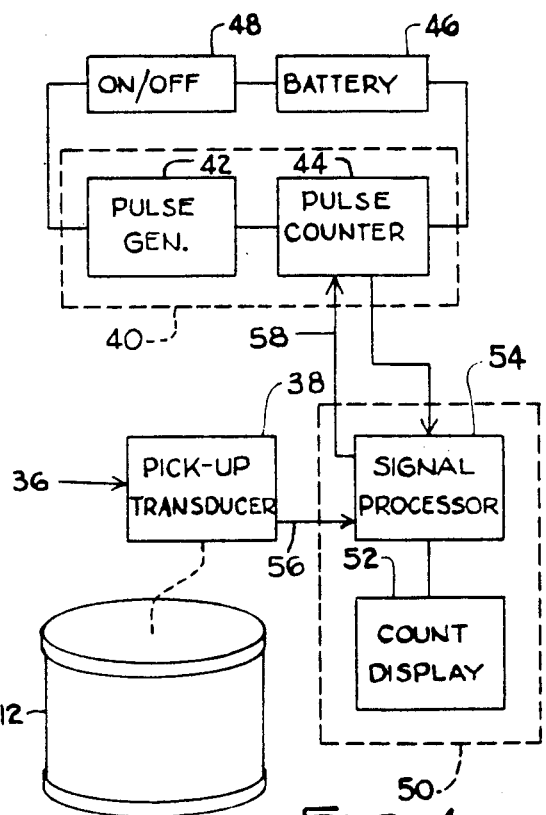
FIG. 4 is a view showing in generalized block diagram form the control circuit for a monitoring operation conducted with the FIG. 1 embodiment and drum.

With reference to FIGS. 3 and 4, the device 10 further includes means, generally indicated 36, for sensing each tempo beat generated by the drum 12. The sensing means 36 includes a pickup transducer 38 mounted within the skin-engaging surface 32 so as to face generally downwardly therefrom. In the device 10, the pickup transducer 38 is in the form of a piezo transducer adapted to sense vibrations of the skin 82 of the snare drum 12 and generate electrical impulses corresponding to the sensed vibrations.

With reference to FIG. 4, which is a generalized block diagram of the control circuit, the device 10 further includes computer means 40 mounted within the box 16 for receiving the electrical impulses generated by the pickup transducer 38 and for measuring the time interval between successive beats and for dividing the interval into a time unit, i.e. minute. More specifically, the computer means 40 includes means, indicated 42, for generating a preselected number of electrical pulses per unit of time and means, indicated 44, for counting the pulses generated from the occurrence of one beat to the occurrence of the subsequent beat. In the device 10, the pulse generator 42 is in the form of a twenty hertz counter adapted to generate electrical pulses at regular intervals. The pulse counter 44 is adapted to generate an output signal to the signal processor 54 corresponding to the pulse count the instant a subsequent impulse generated by the transducer 38 is sensed. The output of pick-up transducer 38 is connected via line 56 to an input of signal processor 54, and a reset pulse is sent back from processor 54 via line 58 to the pulse counter 44 after its signal is processed to start the count at zero for the next interval. The device 10 has an effective range of about nineteen beats per minute to about 133 beats per minute, and such a range is believed to cover most tempos normally encountered by the musician.

The device 10 further includes a power source in the form of a battery 46 mounted within the box 16 (FIG. 2) for applying power to the computer means 40 and an ON/OFF switch 48 appropriately wired between the battery 46 and computer means 40 permitting the musician or operator to turn the device ON or OFF at will. As shown in FIGS. 2 and 3, the switch 48 is mounted in the bottom surface 24 of the box 16 so as to be easily accessible to the musician.

With reference again to FIGS. 2 and 4, the device 10 further includes indicator means, generally indicated 50, for visually indicating to the rate at which beats are being played. To this end, the indicator means 50 includes means, indicated 54 in FIG. 4, for processing an output time-indicating signal corresponding to the rate of the input signal and a light-emitting diode (LED) display 52 mounted on the top surface 22 of the box 16 for displaying the rate count corresponding to the time-indicating signal generated by signal processor 54 in the form of a numerical value. Preferably, the display 52 is relatively large enabling the musician to easily read the count displayed thereby. The indicator means 50 is adapted to display or hold the rate count on the display 52 until such time as the signal processor 54 receives a subsequent input signal from the transducer 38. Upon receiving the subsequent signal, the rate count corresponding to the subsequent output signal of the pulse counter 44 is displayed upon the display 52.

When operatively positioned upon the snare drum with its pickup transducer 38 engagably and flatly overlying an edge of the drum skin 82 in the manner shown in FIG. 1, the transducer 38 is in condition to sense the relatively strong tempo beat vibrations generated with the drum 12. Hence, with the device 10 switched ON and the drum 12 being played, the tempo beats are sensed by the pickup transducer 38 and appropriate electrical impulses are generated thereby in response to the tempo beats. The twenty hertz counter 44, once turned ON, continually counts the regular electrical pulses generated by the pulse generator 42 and restarts the count at zero upon the receipt of each signal sent from the signal processor 54. Therefore, each reset beat sensed is responsible for the sending to the indicator means 50 an output signal having a characteristic which corresponds to the count of the electrical pulses of the counter 44 and for restarting the pulse count of the counter 44 at zero.

FIG. 5 is a more detailed block diagram, in the form of a TTL flow chart, of the control circuit of the monitoring device of the present invention. The output of pick-up transducer 38 is connected to the input of a threshold adjustment circuit 90 for providing volume sensitivity. Circuit 90 typically includes a 5K potentiometer. The output of threshold adjustment 90 is connected to the input of a signal conditioner 92 for eliminating static or false signals. Conditioner 92 can comprise a Schmitt trigger circuit or, preferably, a hex inverter with shunt resistor. Conditioner 92 provides a + pulse output on line 94, and an inverted output on line 96 as indicated in FIG. 5.

The control circuit shown in FIG. 5 further comprises first and second counters 98 and 100, respectively, first and second timers 102 and 104, respectively, and a rate multiplier 106. The inverted output of conditioner 92 is connected by line 96 to the reset input of the first timer 102, which is a relatively slow timer putting out 20 Hz pulses. The output of timer 102, in turn, is connected to the input of the first counter 98, which is a relatively slow counter. The + pulse output of conditioner 92 on line 94 is connected to the reset inputs of each of the counter/drivers 108 which, in turn, are connected to their corresponding LED display elements 110. The signal conditioner output on line 94 also is connected to the reset inputs of rate multiplier 106 and the second counter 100.

The control circuit further comprises an AND gate circuit 112 which starts and stops fast timer 104. By way of example, AND gate 112 is a dual 4 input AND gate provided with leading edge triggering. This together with a capacitive circuit provides a pulse generating capability in a known manner to reset counter 98. In particular, the output of counter 100 is connected to inputs of gate 112. Gate 112, in turn, is connected by line 114 to blanking inputs of counter/drivers 108, by line 116 to the reset input of timer 104, by line 118 through a pulse generator 120 to the clear input of counter 98, and by line 122 to the strobe input of rate multiplier 106.

In operation, the transducer or microphone 38 "hears" a drummer's beat and the output signal thereof is conditioned by circuit 92 to be TTL compatible. The outputs of circuit 92 are sent to counter/driver 108, rate multiplier 106, counter 100 and timer 102 as previously described. At this instant in time, counter 98 has stored the number of pulses realized since the last drum beat and is placing that number at the rate inputs of rate multiplier 106. In response to the beat, the counter drivers 108 are set to zero, counter 100 is set to zero and gate 112 is turned OFF which turns ON the fast timer 104. With the reset command having been withdrawn from the rate multiplier 106 by the signal on line 94 from conditioner 92, rate multiplier 106 then divides the interval being addressed to its inputs into 1200 and sends the signal result or base rate via line 124 to the LED counter/drivers 108.

When counter 100 reaches 1200(1200×20 Hz=1 minute) it causes AND gate 112 to stop the fast timer 104, strobe the rate multiplier 106 via line 122 and clear counter 98 via pulse generator 120 in time to receive the next subsequent 20 Hz pulse. The entire process is repeated in response to the next drum beat sensed by transducer 38.

Thus, the circuit of FIG. 5 measures the time between consecutive beats and divides that interval into one minute, then provides a read-out via LEDs 110 of the beats per minute.

Figure 6:
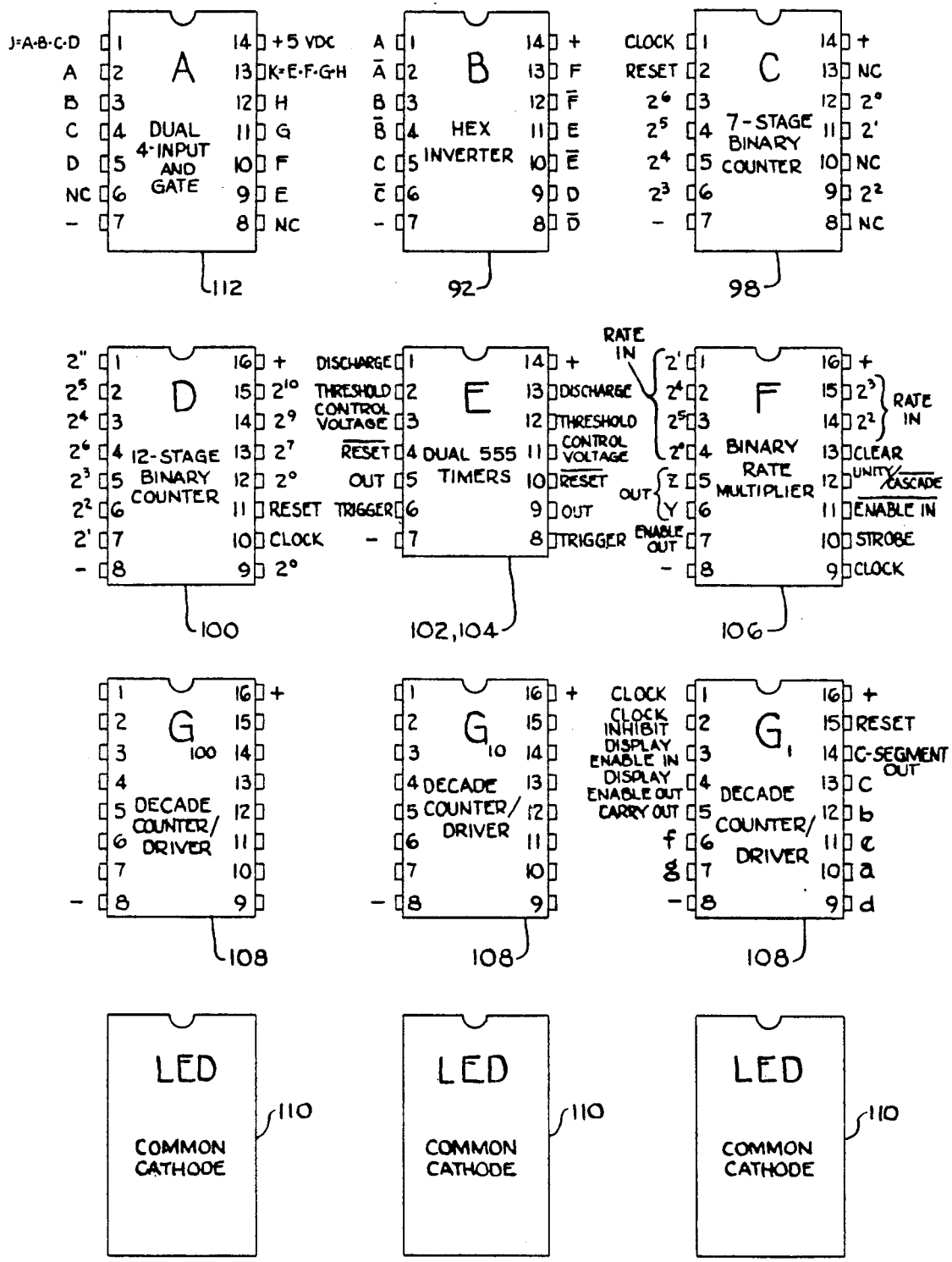
FIG. 6 is a diagrammatic view of a circuit chip layout for implementing the control circuit of FIG. 5.

By way of further illustration, FIG. 6 shows an actual circuit chip layout for implementing the control circuit represented by the TTL flow chart of FIG. 5. Transducer 38 and threshold adjustment 90 are not shown in FIG. 6. The reference numerals of the chips in FIG. 6 correspond to the reference numerals in FIG. 5. The letters A–G on the chips in FIG. 6 provide a cross-reference to columns A–G in the following table which sets forth the chip interconnections:

binary rate multiplier 106 is type 7497, decade counter/drivers 108 are type CD4026B and LED display elements 110 are common cathode type.

The device 10 is advantageous in that it provides to the musician or operator visual feedback or information of the actual tempo of the music played with the drum 12. Inasmuch as the count of the electrical pulses generated by the counter 44 increases as a function of time, the musician need only view the display 52 to be informed of the relative speed or steadiness of the tempo of the music played. For example, if successive displays of the rate count indicate a relatively low numerical value, the musician is informed that the tempo is relatively slow. Similarly, if successive displays of the rate count indicates a relatively high numerical value, the

TABLE I

Interconnections of Circuit Chips in FIG. 6

| A | | B | | | C | | D | |
|---|---|---|---|---|---|---|---|---|
| | 1-A12 | | 1-B6(w/cap) | Res.→+<br>Res.→− | | 1-E9 | | 1-NC |
| | 2-+ | | 2-B13,C2 | | | 2-B2,B13 | | 2-A4 |
| | 3-D3 | | 3-B10 | | | 3-R.Decimal | | 3-A3 |
| | 4-D2 | | 4-D11,G15 | | | 4-F3 | | 4-NC |
| | 5-+ | | 5-A13,F10 | | | 5-F2 | | 5-NC |
| | 6-NC | | 6-E4,B1(w/cap.) | | | 6-F15 | | 6-NC |
| | 7-− | | 7-− | | | 7-− | | 7-NC |
| | 8-NC | | 8-G2,G3 | | | 8-NC | | 8-− |
| | 9-+ | | 9-Signal Input + | | | 9-F14 | | 9-NC |
| | 10-D15 | | 10-B3 | | | 10-NC | | 10-F5 |
| | 11-D13 | | 11-B9(w/cap.),Res.−,F13 | | | 11-F1 | | 11-G15,B4 |
| | 12-A1 | | 12-E10 | | | 12-F4 | | 12-NC |
| | 13-B5,F10 | | 13-B2C2 | | | 13-NC | | 13-A11 |
| | 14-+ | | 14-+ | | | 14-+ | | 14-NC |
| | | | | | | | | 15-A10 |
| | | | | | | | | 16-+ |
| E | 1Res.→+<br>Res.→E2 | F | 1-C11 | | G | 1-F7 | | |
| | 2-E-6, Res.→E1<br>Cap.→− | | 2-C5 | | | 2-B8 | | |
| | 3-NC | | 3-C4 | | | 3-B8 | | |
| | 4-B6,etc. | | 4-C12 | | | 4-NC | | |
| | 5-F9 | | 5-D10 | | | 5-G101,etc. | | |
| | 6-E2,etc. | | 6-NC | | | 6-LED f | | |
| | 7-− | | 7-G1 | | | 7-LED g | | |
| | 8-E12,etc. | | 8-− | | | 8-− | | |
| | 9-C1 | | 9-E5 | | | 9-LED d | | |
| | 10-B12 | | 10-B5,A13 | | | 10-LED a | | |
| | 11-NC | | 11-− | | | 11-LED e | | |
| | 12-E8,Pot.→E13etc | | 12-− | | | 12-LED b | | |
| | 13-Res.→+,Pot.→ E12 | | 13-B11 | | | 13-LED c | | |
| | 14-+ | | 14-C9 | | | 14-NC | | |
| | | | 15-C6 | | | 15-D11,B4 | | |
| | | | 16-+ | | | 16-+ | | |

Thus, referring to column A in Table 1, row 13 gives B5 which means that terminal 13 on chip A, the dual 4 input AND gate is connected to terminal 5 on chip B, the hex inverter (conditioner 92). Similarly, referring to column C, row 4 gives F3 which means that terminal 4 on chip C, the counter 98, is connected to terminal 3 on chip F, the rate multiplier 106. This is one of the several connections between the output of counter 98 and rate multiplier 106. By way of further explanation, several of the entries in Table 1 indicated that the connections from one chip terminal to another is through a resistor, capacitor or potentiometer, for example rows 1 and 6 in column B and rows 1,2,12 and 13 in column E. Rows 6–13 in column G indicate the various terminals i.e. f,g,d, etc., of the LED display segments to which connections are made.

By way of example, in an illustrative circuit, dual 4-input AND gate 112 is type CD4082B, hex inverter 92 is type 7414, 7-stage binary counter 98 is type CD4024B, 12-stage binary counter 100 is type CD4040B, dual 555 timers 102,104 are type LM556N, musician is informed that the tempo is relatively fast.

With regard to the steadiness of the tempo, the musician need only observe the relative steadiness of the displayed count. For example, a relatively small variation in the displayed count over a period of several tempo beats would indicate to the musician that the tempo is relatively steady. An unsteady tempo would be reflected by a relaitively large variation in the displayed count over a period of several tempo beats. Therefore, the musician can tell by a glance at the display 52 whether his play out of rhythm or his tempo is irregular.

The device 10 is further advantageous in that it permits a musician to pace himself and increase or decrease the music tempo at selected portions of the music played therefore providing the musician with flexibility in his choice of tempo rates during play. This advantage can be readily appreciated when compared to known apparatus, such as click track recording, used to generate tempo beats which the musician, in turn, is expected to follow. The accuracy and relentlessness with which such beats are generated prohibit any artisan variation of the tempo as music is played and is believed to add to a "stiffness" in the sound of the music played. The device 10, in contrast, is responsive to the beats generated at the hand of the musician thereby permitting the musician to vary the tempo of the music played in accordance with his desires yet monitor at a glance the steadiness of the tempo during selected portions of the music played.

The device 10 is silent in operation so as to not interfere with the music played and is lightweight, compact and portable for ease of handling. The device 10 is well-suited for practice applications to help the musician improve his meter and for live and studio performance applications.

The method of the invention includes the steps involved in monitoring the tempo of music played with the snare drum 12. More specifically, the steps include the sensing of each tempo beat, measuring the time interval between successive tempo beats, dividing the interval into a time unit, i.e. minute, and visually indicating the measured beats/time interval, i.e. beats/minute, between each two successive beats.

Figure 7:
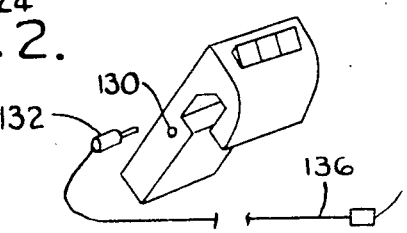
FIG. 7 is a perspective view of an alternative embodiment of the device in accordance with the present invention.

It will be understood that many modifications and substitutions can be had to the aforedescribed embodiments without departing from the spirit of the invention. For example, although the transducer 38 for sensing the tempo beats has been shown and described above as mounted upon the box 16 of the device 10 of FIGS. 1-3, a beat-sensing transducer can be mounted remote of the box 16. To this end and with reference to FIGS. 1 and 7, the device 10 includes a female receptacle 90 and 130 for receiving a plug-in jack 132, and the jack 132 is connected to a pickup transducer 134 by means of a relatively long wire 136. The device 10 further includes appropriate electrical connections between the receptacle 130 and the computer means 40 permitting impulses generated by the transducer 134 to be received by the computer means 40. Hence, the device 10 and transducer 134 of FIG. 7 collectively provide a tempo-monitoring assembly with remote pick-up. The FIG. 7 assembly is therefore suitable for tempo-monitoring applications in which it is desirable to position the indicator means, or more specifically, the count display remote of the instrument being played for easy viewing by a musician. In such an instance, the transducer 134 need only be positioned in close physical proximity to the sound-generating component of the instrument for sensing the vibrations generated thereby.

Furthermore, although the device 10 of FIGS. 1-4 has been shown and described as including a power source in the form of a battery 46, it will be understood that a device in accordance with the present invention can be appropriately wired to accept power from an electrical outlet through a power cord. Accordingly, the aforedescribed embodiments are intended for the purpose of illustration and not as limitation.

I claim:

1. A device for providing a display of tempo of the music played on a drum generating tempo beats, the drum having an annular rim disposed about a skin over the end of a drum shell; said device comprising:
    a housing assembly adapted to hang externally from the rim of the drum and having a hook-shaped upper portion disposable over the rim, an end section of the upper portion being disposable over and engageable with the skin of the drum, the housing assembly including sensing means carried by said end section of the upper portion of the housing to contact the skin of the drum when the housing is hanging from the rim of the drum, said sensing means providing beat signals in response to the tempo beats generated by the drum;
    computer means carried by the housing assembly, the computer means being responsive to the beat signals for measuring a time interval between successive beat signals and calculating the number of beats per unit of time; and
    display means mounted on the upper portion of the housing assembly and associated with the computer means for providing a visual indication of the calculated value of the number of beats per unit of time.

2. The device in accordance with claim 1 wherein said computer means includes means for generating a preselected number of electrical pulses per unit time, means for counting the pulses generated from the instant one beat signal is received to the instant that another beat signal is received, means for dividing the pulses into a time unit, and means for sending the beats/time unit value in the form of a rate count to said display means at the sensing of said another beat.

3. The device in accordance with claim 2 wherein said display means is adapted to display the calculated value in the form of a numerical value in terms of beats/minute.

4. A method of providing a display of the tempo of music played on a drum having an annular rim disposed about a skin over the end of a drum shell, said method comprising the following steps:
    providing a housing assembly adapted to hang externally from the rim of a drum with a hook-shaped upper portion having an end section of hook-shaped upper portion of the housing disposable over and engageable with the skin of the drum, the housing assembly including sensing means carried by the end section of the upper portion of the housing which is adapted to be disposed over the rim, the sensing means being adapted to contact the skin of the drum when the housing is hanging about the rim of the drum, the sensing means being a transducer capable of providing beat signals in response to the tempo beats of the drum, the housing further including computer means responsive to the beat signals for measuring a time interval between successive beat signals and for calculating the number of beats per unit of time, and the housing further including display means mounted on the upper portion of the housing and associated with the computer means for providing a visual indication of the calculated value of the number of tempo beats per unit of time;
    mounting said housing assembly externally from the rim of a drum by hanging said hook-shaped portion thereof over said drum rim with the sensing means in contact with the skin of the drum; and
    repeatedly hitting the skin of the drum to generate tempo beats within the skin of the drum the number of tempo beats per unit of time being displayed on a display means.

* * * * *